Dec. 5, 1967  R. M. EIDAL  3,356,016
AUTOMOBILE BODY DISPOSAL APPARATUS
Filed April 6, 1966  11 Sheets-Sheet 1

INVENTOR.
ROY M. EIDAL
BY
Willard S. Grow
ATTORNEY

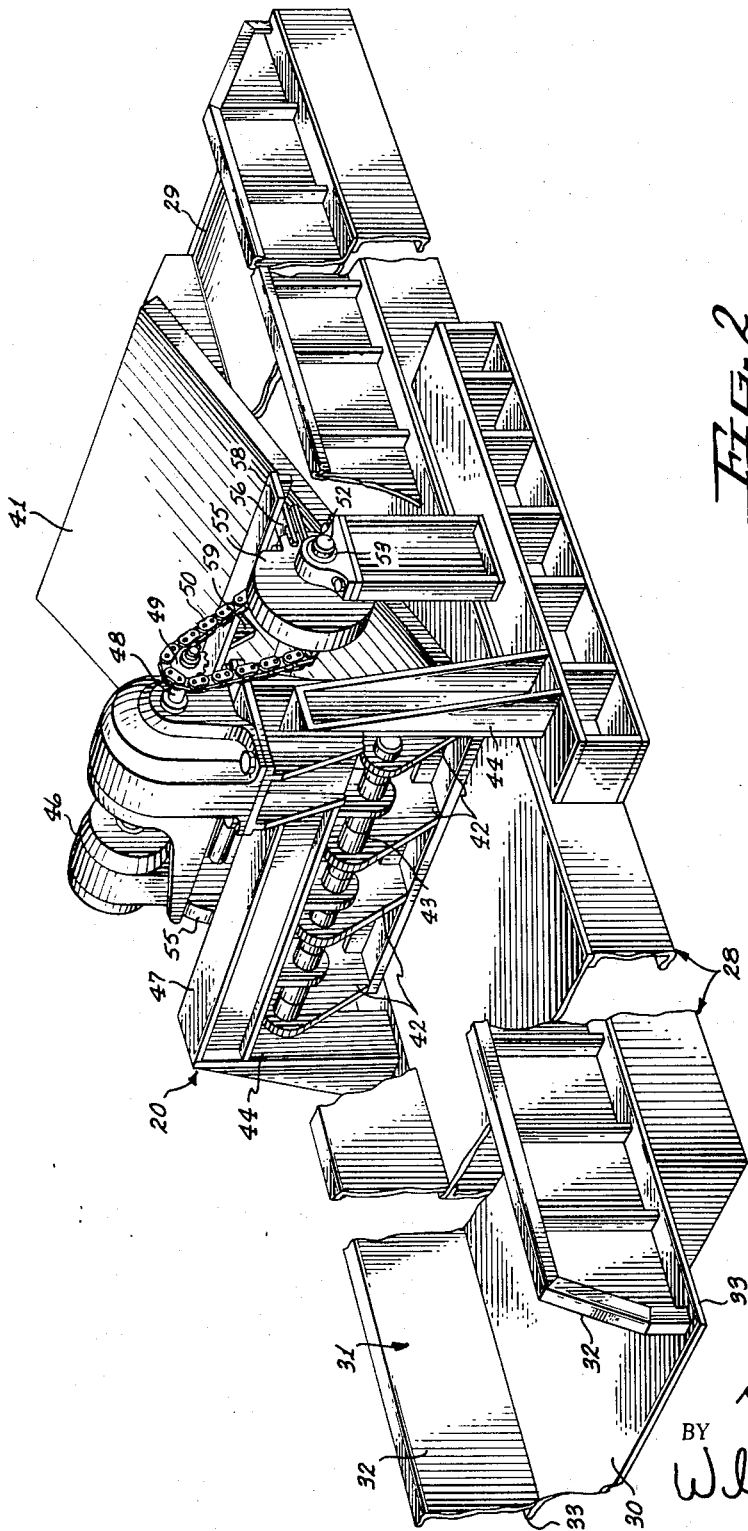

Dec. 5, 1967    R. M. EIDAL    3,356,016
AUTOMOBILE BODY DISPOSAL APPARATUS
Filed April 6, 1966    11 Sheets-Sheet 3
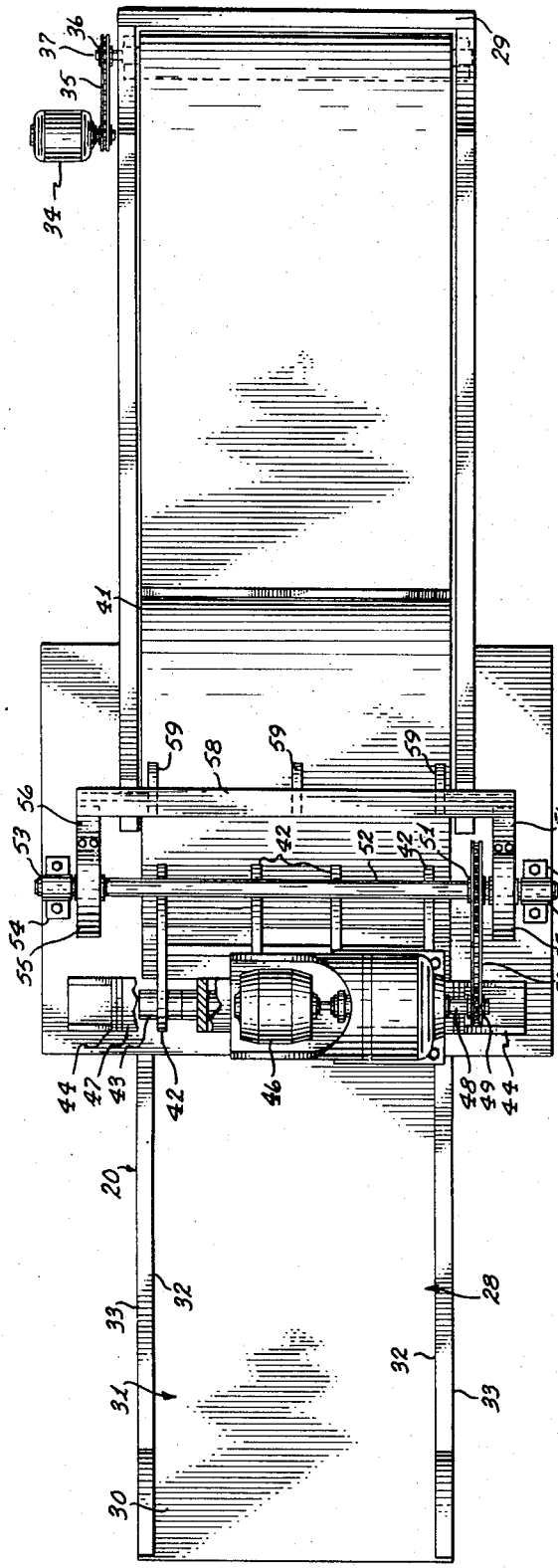
INVENTOR.
ROY M. EIDAL
BY
Willard S. Groen
ATTORNEY

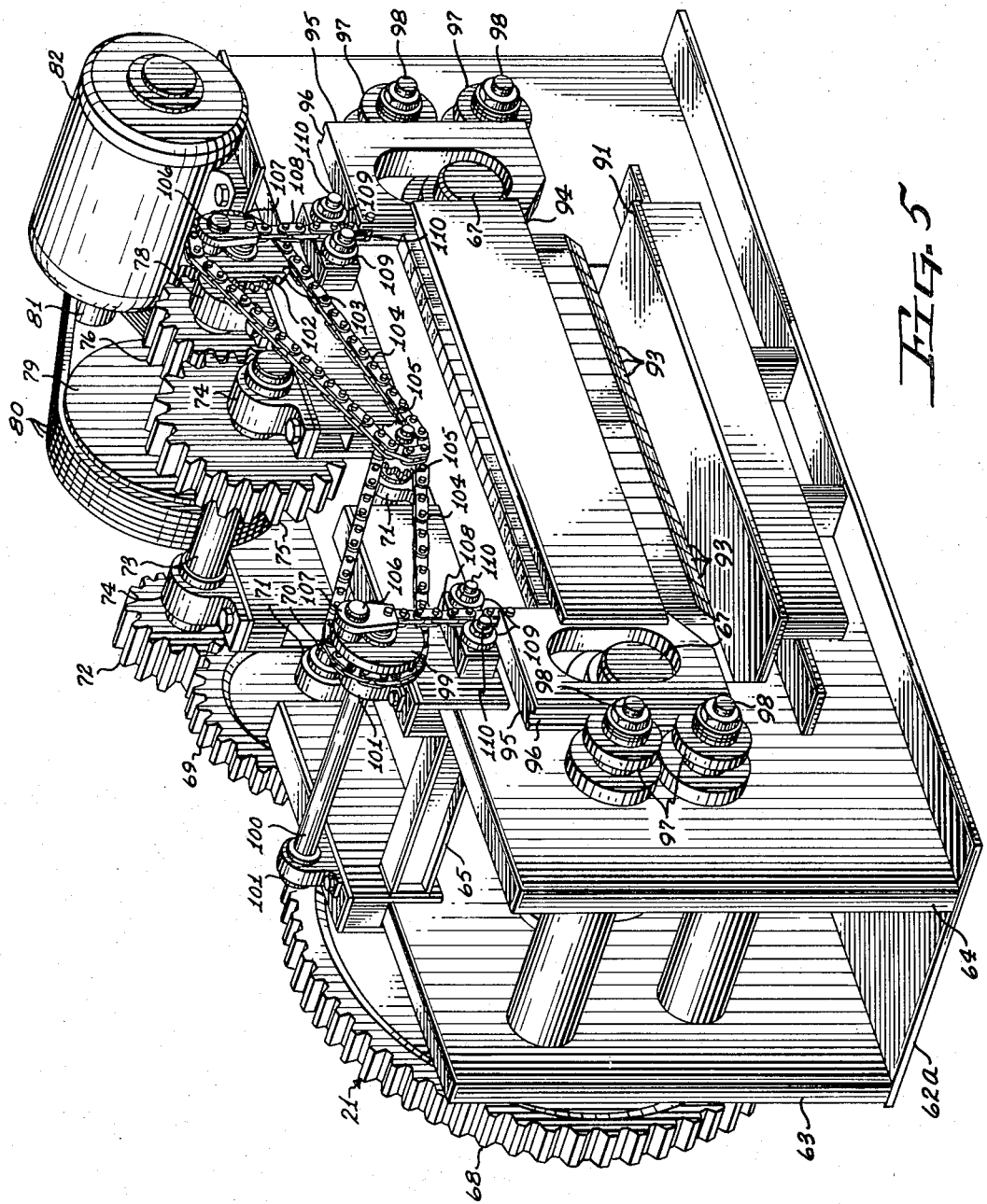

Dec. 5, 1967 R. M. EIDAL 3,356,016
AUTOMOBILE BODY DISPOSAL APPARATUS
Filed April 6, 1966 11 Sheets-Sheet 5

INVENTOR.
ROY M. EIDAL
BY
Willard S. Groen
ATTORNEY

Dec. 5, 1967 R. M. EIDAL 3,356,016
AUTOMOBILE BODY DISPOSAL APPARATUS
Filed April 6, 1966 11 Sheets-Sheet 6

INVENTOR.
Roy M. Eidal
BY
Willard S. Groen
ATTORNEY

Dec. 5, 1967  R. M. EIDAL  3,356,016
AUTOMOBILE BODY DISPOSAL APPARATUS
Filed April 6, 1966  11 Sheets-Sheet 7

INVENTOR.
Roy M. Eidal
BY
ATTORNEY

Dec. 5, 1967  R. M. EIDAL  3,356,016
AUTOMOBILE BODY DISPOSAL APPARATUS
Filed April 6, 1966  11 Sheets-Sheet 8

INVENTOR.
ROY M. EIDAL
BY
Willard S. Grow
ATTORNEY

Dec. 5, 1967  R. M. EIDAL  3,356,016
AUTOMOBILE BODY DISPOSAL APPARATUS
Filed April 6, 1966  11 Sheets-Sheet 9

INVENTOR.
ROY M. EIDAL
BY
Willard S. Groen
ATTORNEY

Dec. 5, 1967   R. M. EIDAL   3,356,016
AUTOMOBILE BODY DISPOSAL APPARATUS
Filed April 6, 1966   11 Sheets-Sheet 10

INVENTOR.
ROY M. EIDAL
BY
Willard S. Groen
ATTORNEY

Dec. 5, 1967   R. M. EIDAL   3,356,016
AUTOMOBILE BODY DISPOSAL APPARATUS
Filed April 6, 1966   11 Sheets-Sheet 11

INVENTOR.
ROY M. EIDAL
BY
Willard S. Grew
ATTORNEY

United States Patent Office 3,356,016
Patented Dec. 5, 1967

3,356,016
AUTOMOBILE BODY DISPOSAL APPARATUS
Roy M. Eidal, Albuquerque, N. Mex., assignor to Southwest Factories, Inc., Oklahoma City, Okla., a corporation of Oklahoma
Filed Apr. 6, 1966, Ser. No. 540,694
9 Claims. (Cl. 100—97)

This invention pertains to metal working machinery and is particularly directed to an automobile body disposal apparatus.

One of the objects of this invention is to provide a metal working machine particularly adapted to flattening, shearing, chopping, cleaning and compacting automobile bodies into a highly acceptable and usable form of high quality scrap for steel furnaces, electric furnaces and the like.

Another object of this invention is to provide an automobile body disposal apparatus having a continuous feed through operation of high speed and efficiency.

A further object of this invention is to provide an automobile body disposal apparatus having a series of demountable and portable operating units.

Still another object is to provide a unitized automobile body destructing apparatus that progressively effects flattening and crushing of the body to manipulatable relatively thin slabs; laterally shearing chunks from said slabs, chopping laterally said chunks, and compacting said chunks to pulverize and clean the material and reduce it to a relatively fine aggregate of highly acceptable and usable scrap metal.

It is also an object to provide an automobile body disposal system adapted to reduce the bodies to highly compacted disintegrated condition utilizing greatly reduced storage space, and much more compact and more easily handled for shipping and charging steel furnaces.

Further features and advantages of this invention will appear from a detailed description of the drawings in which:

FIG. 2 is an enlarged perspective view of the initial body flattening unit.

FIG. 3 is a plan view of the body flattening unit shown in FIG. 2.

FIG. 4 is a side elevation of the body flattening unit shown in FIG. 3.

FIG. 5 is an enlarged perspective view of the compacted slab shearing unit.

General Arrangement

Figure 1:
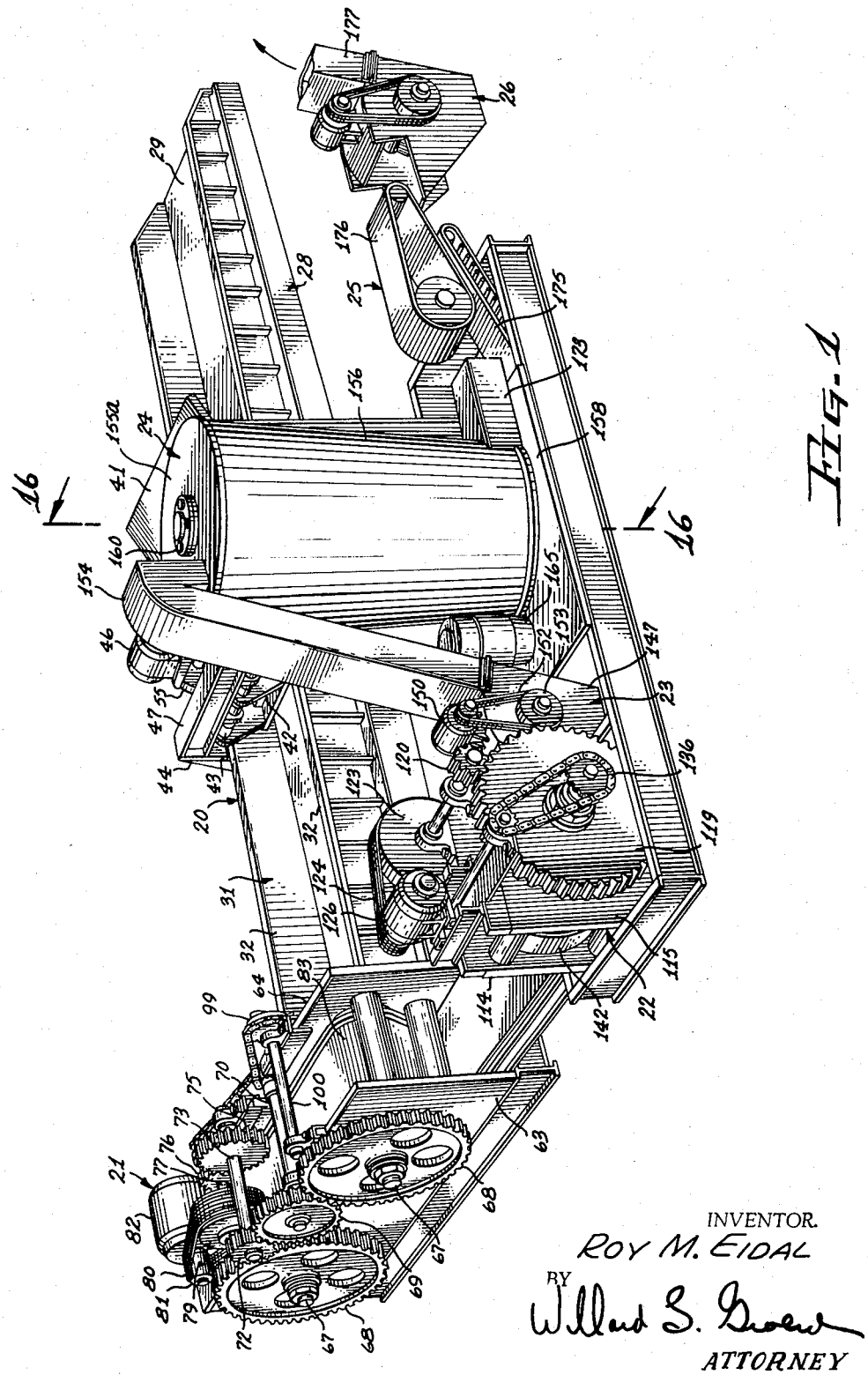
FIG. 1 is a general perspective view of an automobile body disposal apparatus incorporating the principles and system of this invention.
Figure 6:
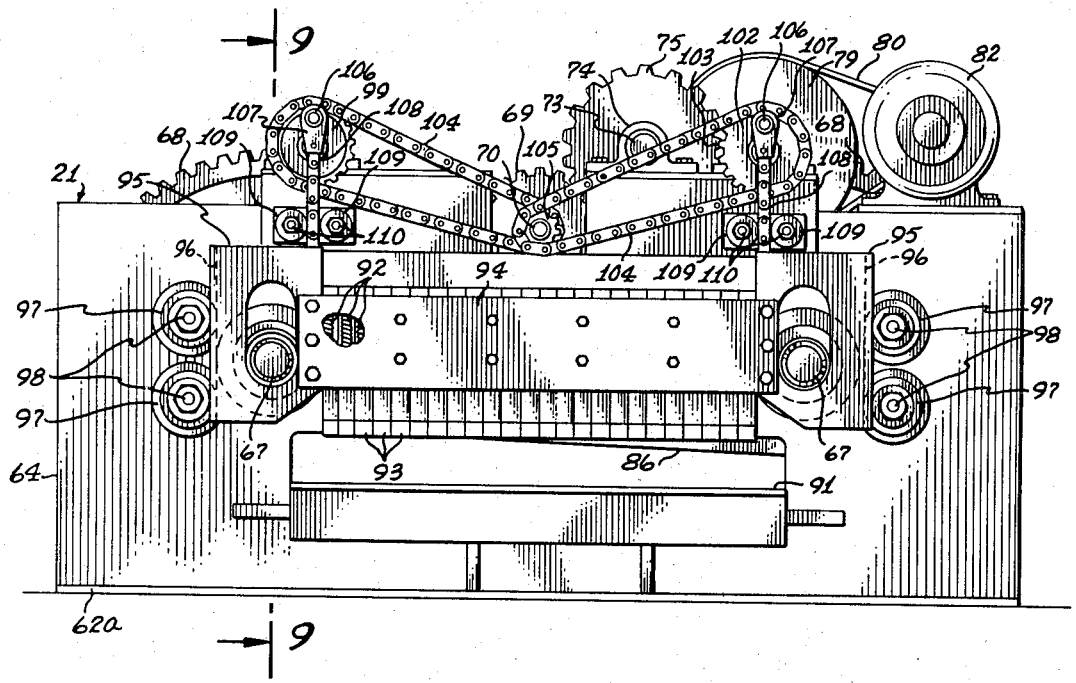
FIG. 6 is a front elevation of the slab shearing unit shown in FIG. 5.
Figure 7:
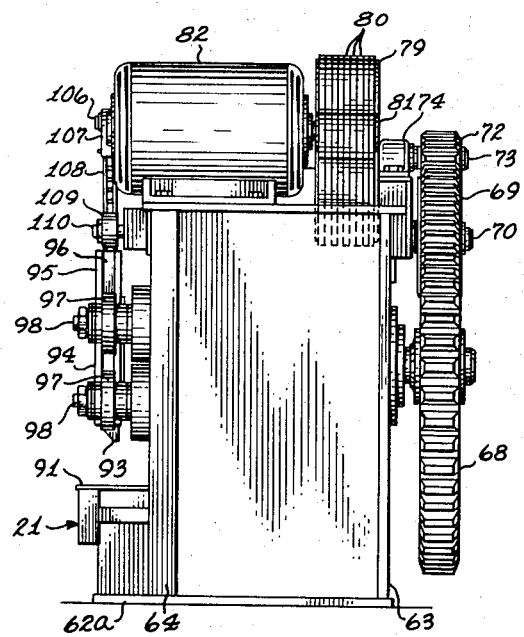
FIG. 7 is an end elevation of the slab shearing unit shown in FIG. 6.
Figure 8:
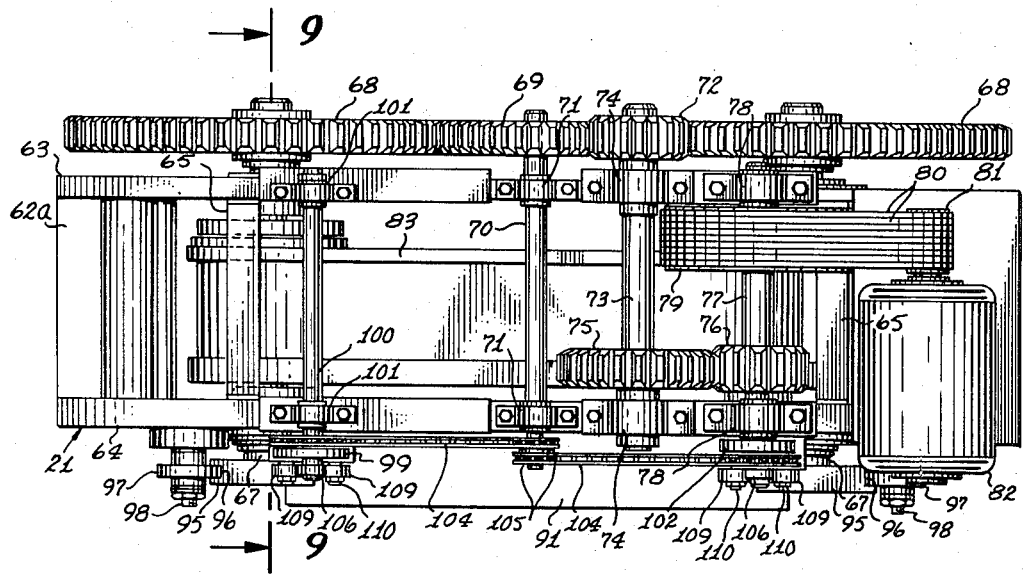
FIG. 8 is a plan view of the slab shearing unit shown in FIGS. 6 and 7.
Figure 9:
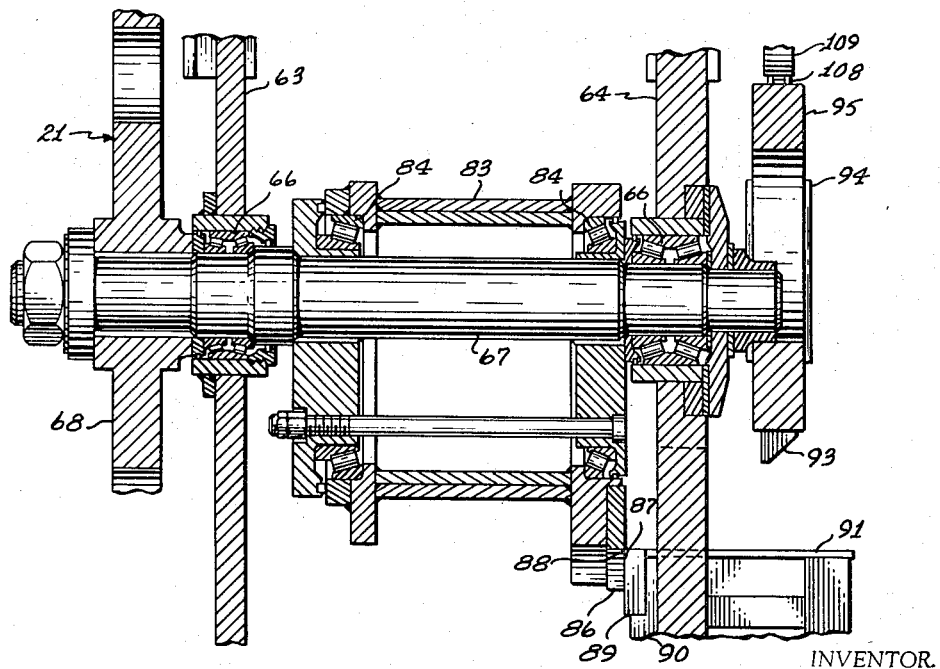
FIG. 9 is an enlarged sectional view on the line 9—9 of FIGS. 6 and 8.
Figure 10:
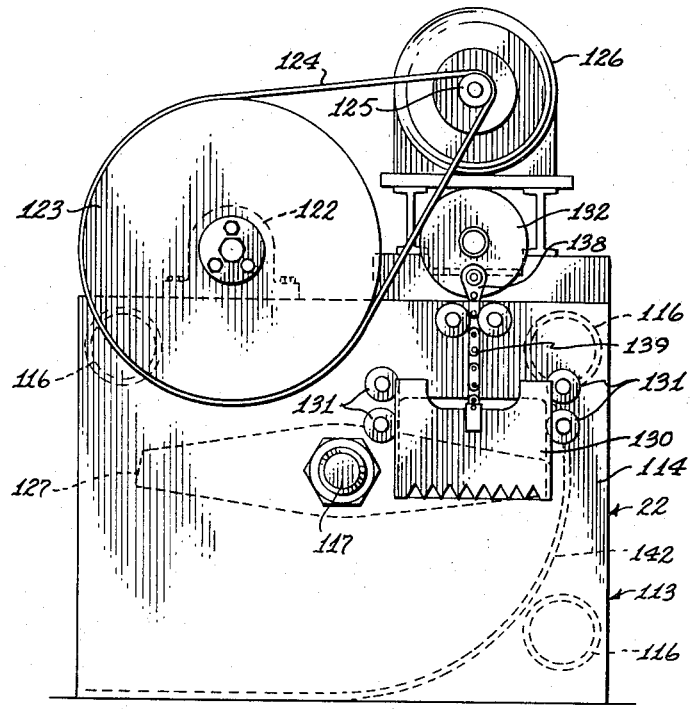
FIG. 10 is an enlarged front elevation of the rotary chopper unit.
Figure 11:
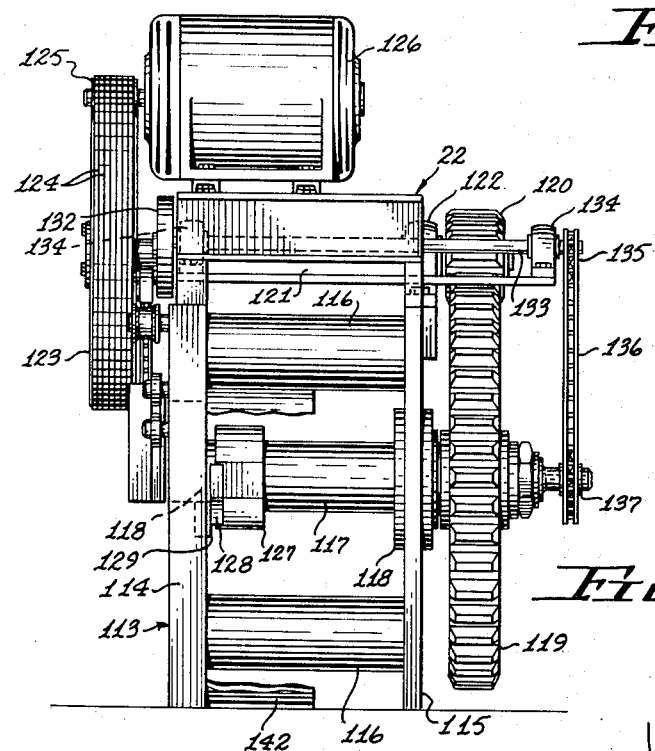
FIG. 11 is an enlarged side elevation of the rotary chopper unit shown in FIG. 10.
Figure 12:
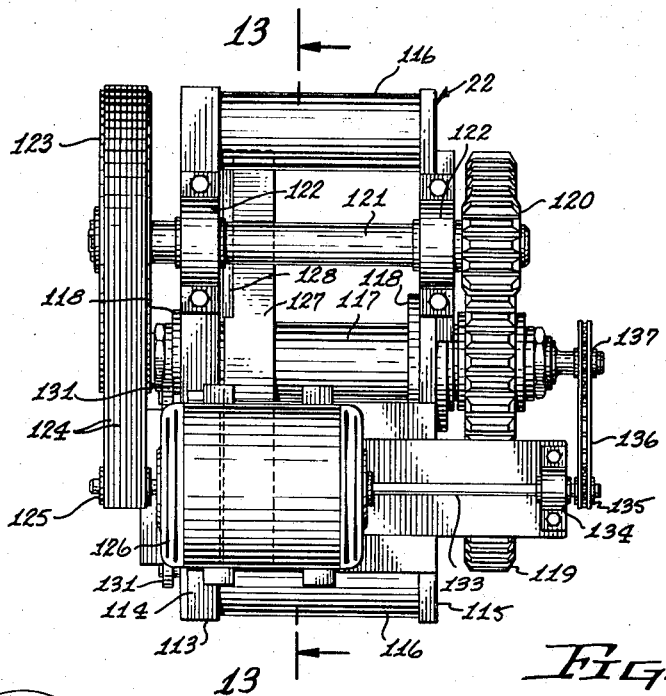
FIG. 12 is a plan view of the rotary chopper shown in FIGS. 10 and 11.

As an example of one embodiment of this invention, there is shown an automobile body disposal apparatus comprising a series of integrated units including an initial body flattening unit 20, a slab shearing unit 21, a rotary chopper unit 22, the chopped steel slinger unit 23, the hammermill cleaning and compacting unit 24, the magnetic separator 25, and the final metal slinger 26. Each of the mentioned units are interrelated so as to take an automobile body 27 and reduce it completely to desired pulverized metal scrap 28a suitable for steel furnaces while the undesirable materials 29a from the bodies 27 are separated for suitable and profitable disposal.

Initial body flattening unit

The initial body flattening unit, particularly shown in FIGS. 2, 3 and 4, comprises a bed 28 having a deck 29 extending longitudinally thereof upon which slides along the floor 30 of the charging box 31 having the sides 32 fixed along the side edges 33 of the floor 30. A suitable power device is provided for reciprocating the charging box 31 on the bed 28 such as a reversible motor 34 connected by a suitable chain 35 connected to a sprocket 36 fixed on the laterally disposed shaft 37 journaled in the bed 28 over which operates the endless chains 38 suitably fixed to the bottom of the charging box 31 and operating over idler sprockets 39 carried on the shaft 40 journaled on the bed 28 so that by appropriately energizing the motor 34 the charging box 31 may be reciprocated back and forth on the bed 28.

Intermediate the ends of the bed 28 is located the body flattening apparatus comprising a crushing plate 41 having integral hinge pieces 42 pivotally mounted on the transverse shaft 43 carried at its ends in the upright columns 44 fixed to the bed 28 so as to normally freely swing down by gravity with its work engaging under surface 45 swinging up and down relative to the top surface of the floor 30 of the charging box 31. The crushing plate 41 is lifted and dropped by the crushing plate motor 46 mounted on the lateral tie bar 47 connected to the columns 44 and having a motor shaft 48 to which is fixed the sprocket 49 over which operates a chain 50 in turn operating over a sprocket 51 fixed to the lateral shaft 52 journaled in suitable bearings 53 supported on the upright standards 54 fixed to the bed 28. Fixed to each of the ends of the shaft 52 adjacent the bearings 53 are the lifting and dropping discs 55 having fixed in the periphery thereof the radially disposed flipper members 56 which engage under the surfaces 57 of the lifter bar 58 fixed to the brackets 59 secured rigidly to the crushing plate 41 and which flipper members 56 raise the plate 41 and then withdraw from under the surfaces 57 to release and drop the plate 41 on the automobile bodies 27 with each revolution of shaft 52 by the motor 46.

Figure 18:
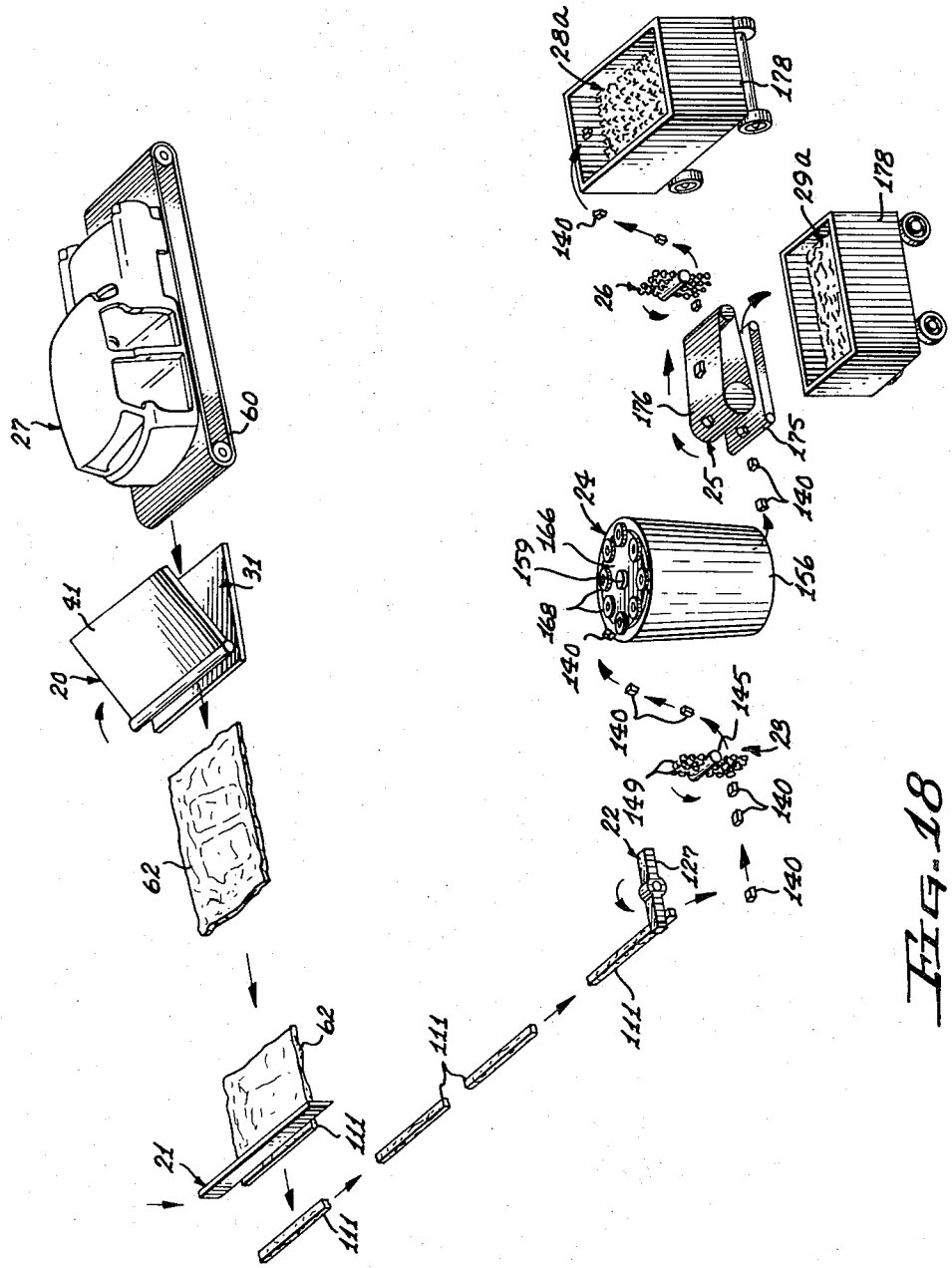
FIG. 18 is a flow diagram of the apparatus shown in FIGS. 1 to 17.

A suitable feeding conveyor 60, FIG. 18, may be employed to continuously present bodies 27 to be crushed to the charging box 31 and the bed deck 29 of the bed 28 so that the reciprocation of the charging box moves the bodies under and through the daylight opening below the angularly disposed crushing plate and out through the heel space 61 in the form of a flattened body slab 62 which is moved to the slab shearing unit 21 by the reciprocation of the charging box 31.

*Slab shearing unit*

The slab shearing unit comprises a base plate 62a to which is rigidly mounted the spaced upstanding side plates 63 and 64 which are secured together at their upper portions by the tie bars 65. Journaled in suitable bearings 66 in the side plates 63 and 64 are the eccentric shafts 67 on the ends of which are fixed the drive gears 68 in common mesh with the idler gear 69 fixed on the idler gear shaft 70 journaled in suitable bearings 71 mounted on the top of the side plates 63 and 64. The idler gear 69 is driven by the pinion 72 on the jack shaft 73 journaled on suitable bearings 74 carried on the top of the side plates 63 and 64 and has a driven gear 75 fixed thereon which in turn is driven from the pulley shaft pinion 76 fixed on the pulley shaft 77 journaled on suitable bearings 78 carried on the top of the side plates 63 and 64. A pulley 79 is fixed on the shaft 77 over which operates suitable multiple V-belts 80 from the motor pulley 81 of the main drive motor 82 mounted on the top of the side plates 63 and 64.

The crosshead 83 is mounted on the bearings 84 on the eccentrics 85 which are suitably fixed to the eccentric shafts 67. A movable shear blade 86 is suitably rigidly mounted on the crosshead 83 so that its cutting edge 87 moves up and down past the cutting edge 88 of the fixed blade 89 rigidly secured to the bolster 90 on the side plate 64 and the base plate 62a. A feed table 91 aligned with the bed deck 29 of the initial body flattening unit 20 serves to feed the slabs 62 into the shear blades as the charging box 31 moves to the left in FIG. 2.

A series of spring biased 92 individually articulated holddown fingers 93 are located above the feed table 91 and carried in the holddown frame 94 having end guide blocks 95 having vertical grooves 96 riding on the guide rollers 97 suitably journaled on stub shafts 98 fixed in the side plate 64. The holddown unit 94–95 is raised and lowered in timed relationship with the operation of the shear blade 86 by the eccentrics 99 fixed on the shaft 100 journaled on suitable bearings 101 on the top of the side plates 63 and 64, and the eccentric 102 journaled on the outer end of the pulley shaft 77. Sprocket teeth 103 are formed on the periphery of each of the eccentrics 99 and 102 over which operate suitable chains 104 which operate over sprockets 105 fixed on the outer end of the idler gear shaft 70. Depending from the crankpins 106 of the eccentrics 99 and 102 are the connecting rods 107, the lower outer ends of which are connected by link chains 108 to the guide blocks 95 of the holddown frame 94–95. Suitable restraining rollers 109 fixed on suitable studs 110 carried in the side plate 64 are provided each side of the chains 108 to provide true vertical up and down movement for the holddown fingers 93. In operation this shearing unit operates continuously and laterally cuts off bars 111 from the flattened body slab 62 as the slabs are fed to the shear from the initial body flattening unit 20.

*Rotary chopper unit*

The laterally sheared bars 111 are conveyed longitudinally by a suitable conveyor to the rotary chopper unit 22 which comprises a frame 113 consisting of a pair of spaced upstanding plates 114 and 115 suitably rigidly secured together by tie pieces 116. The main knife shaft 117 is journaled in suitable bearings 118 in the plates 114 and 115 and has the main drive gear 119 fixed thereon which is in mesh with the drive pinion 120 on the pulley shaft 121 journaled in suitable bearings 122 supported on the plates 114 and 115 and having the main drive pulley 123 fixed on its other end over which operates the multi-V belts 124 in turn operating over the motor pulley 125 of the drive motor 126 mounted on the frame 113. Fixed to the knife shaft 117 is the rotary knife block 127 having a plurality of radially disposed knives 128 rigidly mounted thereon. A fixed knife 129 is mounted on the plate 113 in operative relationship with the knives 128.

Figure 13:
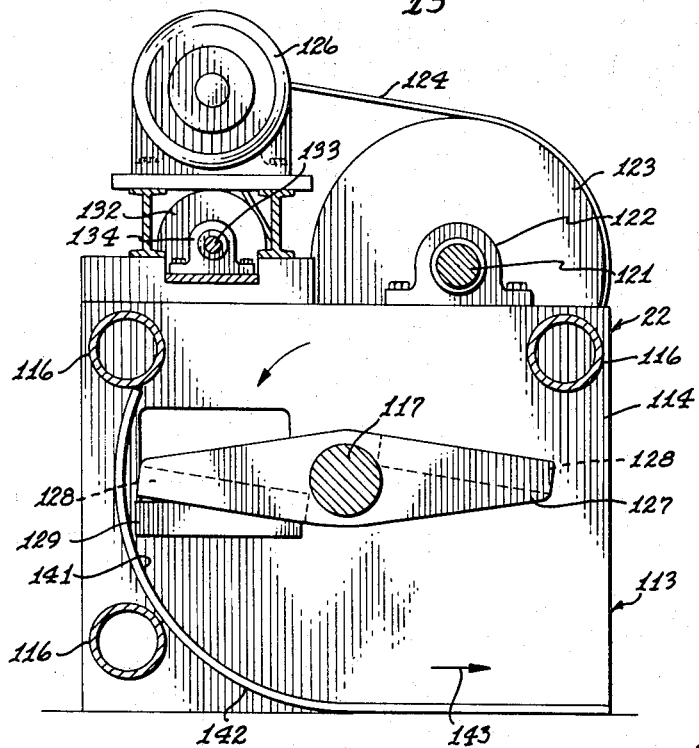
FIG. 13 is an enlarged sectional view on the line 13—13 of FIG. 12.
Figure 14:
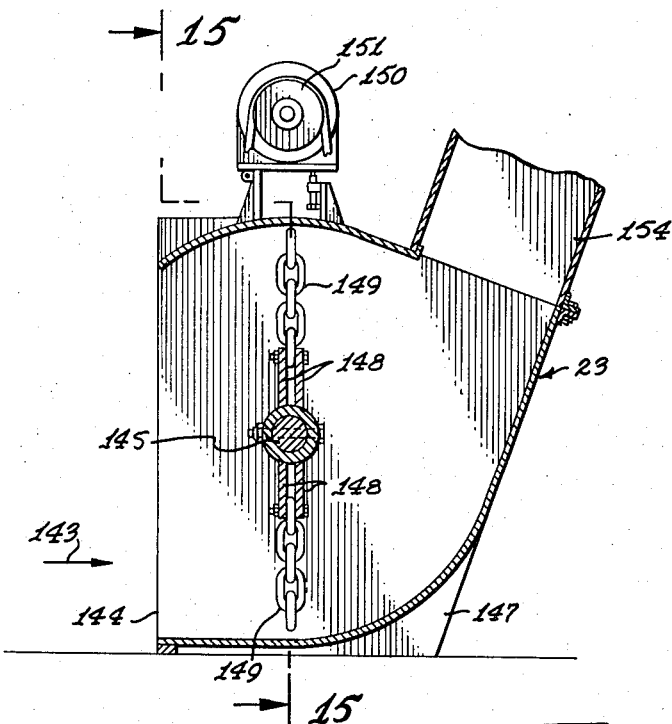
FIG. 14 is an enlarged sectional view of the chopped steel slinger unit on the line 14—14 of FIG. 15.
Figure 15:
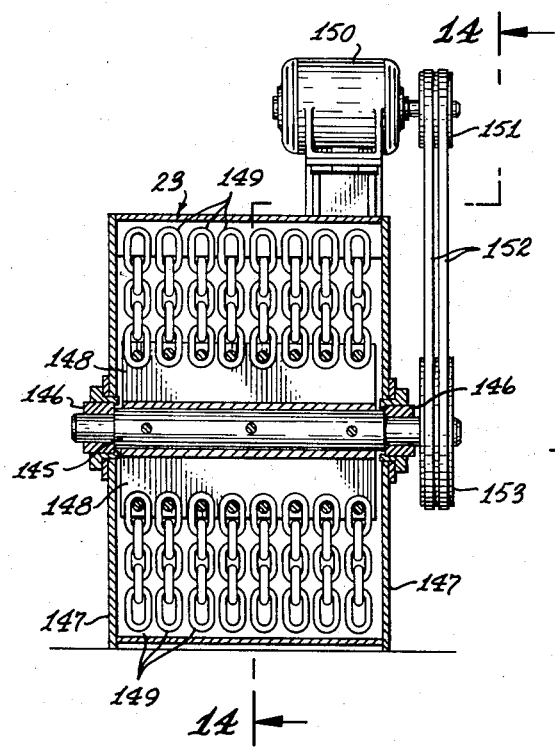
FIG. 15 is an enlarged sectional view on the line 14—14 of FIG. 14.
Figure 16:
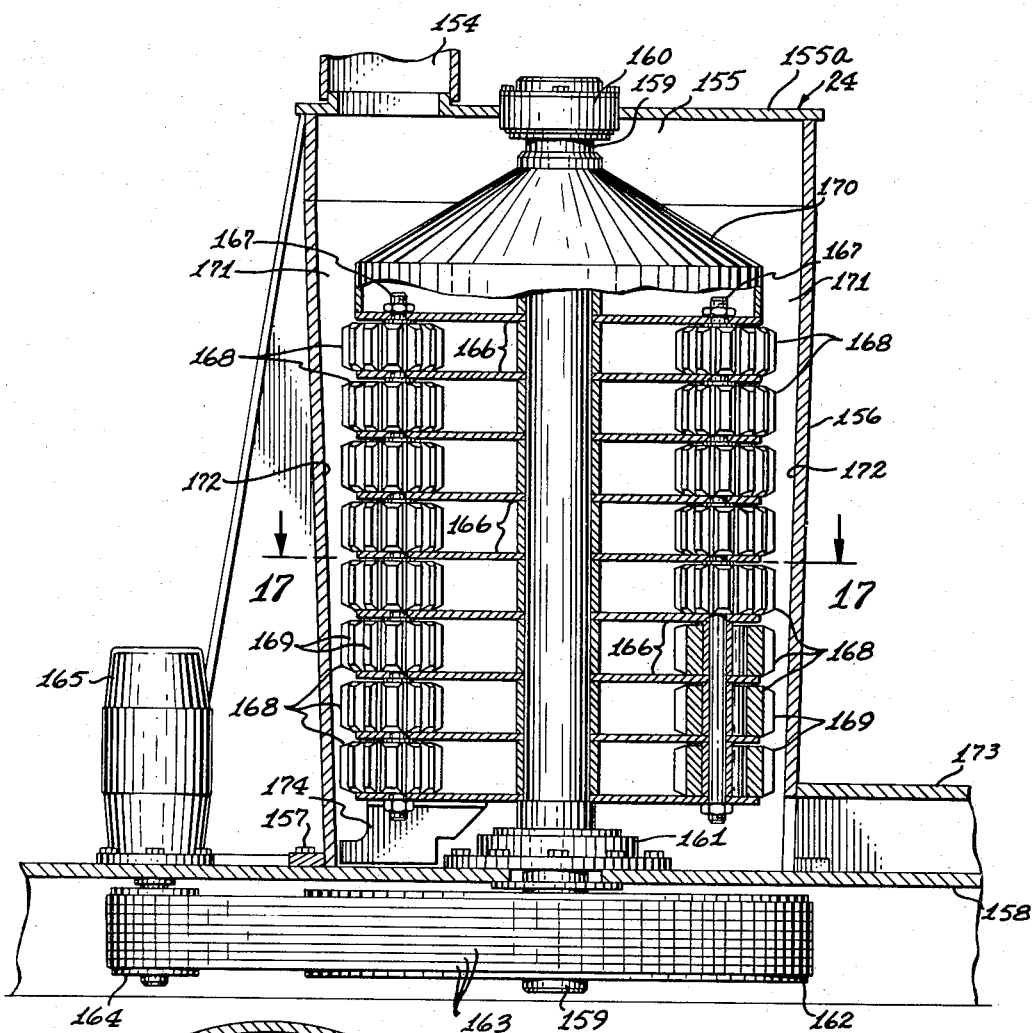
FIG. 16 is an enlarged sectional view of the hammermill cleaning and compacting unit indicated by the line 16—16 of FIG. 1.
Figure 17:
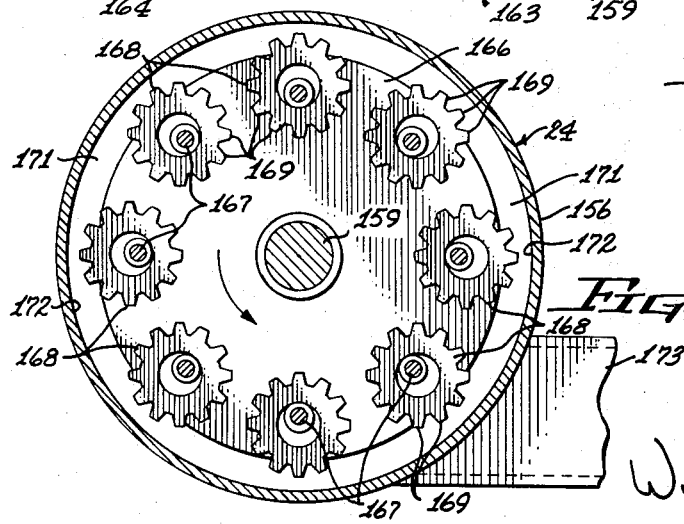
FIG. 17 is an enlarged sectional view on the line 17—17 of FIG. 16.

A holddown plate 130 is guided by suitable guide rollers 131 on the frame plate 114 for vertical reciprocation relative to the work pieces 111 being fed to the chopper unit. The holddown plate 130 is moved in timed relationship with the rotation of the knives 128 so as to secure the work against longitudinal travel whenever a knife is in chopping position and to release the work for feeding movement as the next knife 128 is moving to chopping position. To this end there is provided an eccentric disc 132 fixed on a shaft 133 journaled on suitable bearings 134 on the frame 113 which is connected by a sprocket 135 and a chain 136 to a sprocket 137 fixed on the knife shaft 117. The crankpin 138 of the eccentric 132 is connected by a link chain 139 to the holdown plate 130 so that the plate 130 is raised and dropped in timed relationship with the rotation of the chopper knives 128 so that slugs 140 chopped from the bars 111 are discharged against the arcuate surface 141 of the conveyor plate 142 and then outwardly horizontally as indicated by the arrow 143, FIG. 13, into the receiving end 144 of the chopped steel slinger unit 23, FIGS. 14 and 15, comprising a slinger shaft 145 journaled on suitable bearings 146 carried in the side plates 147 of the chopped steel slinger housing 23. A plurality of circumferentially arranged radial plates 148 are suitably fixed to the shaft 145 and on the outer edges thereof are connected one end of short lengths of chain 149 which swing out radially when the shaft 145 is rotating. A suitable motor 150 is mounted on the unit 23 and has a motor pulley 151 connected by belts 152 to the driven pulley 153 fixed on the shaft 145 so that by energizing the motor 150 the shaft 145 will be rotated causing the chains 149 to initially beat and whip the slugs received from the chopper unit 22 to initially loosen all non-metallic and other foreign matter and trash in the slugs and then whip them up through the discharge conveyor duct 154 for delivery to the hammermill cleaning and compacting unit 24.

*Hammermill cleaning and compacting unit*

The discharge conveyor duct 154 deposits the initially treated slugs 140 into the upper receiving chamber 155 of the hammermill 24 which comprises the top cover 155a secured to the top edge of downwardly converging cylindrical casing 156 which is secured to the bottom floor 158 thereof by suitable bolts 157. A vertically disposed shaft 159 is journaled in a bearing 160 in the top 155a and the lower portion of the shaft 159 is journaled in the bearing 161 in the bottom floor 158, the lower extension of the shaft 159 having a driven pulley 162 over which operates the multi V-belts 163 driven from the pulley 164 on a suitable electric motor 165.

Fixed in vertically spaced positions on the shaft 159 are a series of radially positioned discs 166 at the outer periphery thereof is a series of vertically disposed shafts 167 about which are loosely journaled a series of rotary hammer cutters 168 having work engaging teeth 169. A conical distributing top surface 170 is provided on top of the described rotor assembly on the shaft 159 to cause the material coming in to the chamber 155 from the duct 154 to move out the peripheral work engaging space 171 between the teeth 169 of the hammers 168 and the inside tapered surface 172 of the casing 156 whereupon rotation of the rotor and hammers 168 the slugs of flattened body material are hammered and bettered to knock out the undesired non-ferrous trash and compacting and breaking up the slugs in desired usable form. The remaining materials are swept out of the bottom of the hammermill 24 through the discharge duct 173 by the radially disposed whipping and discharge blades 174 fixed to the bottom of the rotor structure on the shaft 159.

*Final magnetic separation*

Discharge from the discharge duct 173 is deposited on a suitable belt conveyor 175 immediately above which is positioned a magnetic separator belt 176, FIG. 1, which withdraws all ferrous materials and discharges the same into the second metal slinger unit 26 of similar construction to that of the described unit 23 from whence the final fully disintegrated product is delivered through a duct 177 to a suitable rail car or truck 178 for shipment to the steel mill. The material left behind on the conveyor belt 175 is transmitted to a rail car or truck 179 for reclamation or disposal on a dump.

It will thus be seen that there has been provided a continuously operating system and apparatus for reducing automobile bodies to desired usable ferrous granules for steel mill furnaces completely free of foreign contaminants and without producing air pollution required in procedures utilizing steps of burning out the bodies to remove the combustible non-ferrous materials as in prior systems.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A scrap disposal apparatus comprising in combination:
    (A) an initial flattening unit arranged to reduce scrap to flattened slabs,
    (B) a slab shearing unit arranged to laterally shear bars from the ends of said flattened slabs as said slabs are fed through said initial flattening unit,
    (C) a rotary chopper unit arranged to chop slugs from the ends of said sheared bars as said bars are fed longitudinally into said chopper unit,
    (D) a hammermill cleaning and compacting unit,
    (E) a chopped steel slinger unit connected between said rotary chopper unit and said hammermill cleaning and compacting unit arranged to receive the chopped slugs from said rotary chopper unit and initially disintegrate said slugs and deliver the resulting material to said hammermill cleaning and compacting unit,
    (F) and a magnetic separator unit arranged to receive the discharged finally disintegrated, cleaned and compacted material from said hammermill cleaning and compacting unit and separate the ferrous from the non-ferrous materials therefrom.

2. In a scrap disposal apparatus as set forth in claim 1 wherein said initial flattening unit includes,
    (G) a gravity drop scrap crushing plate,
    (H) power means in said unit to intermittently lift and drop said plate,
    (I) and a longitudinally reciprocatable charging box for feeding the scrap into and under said plate to reduce said scrap to slab form.

3. In a scrap disposal apparatus as set forth in claim 1 wherein said slab shearing unit includes a holddown mechanism including,
    (G) a vertically reciprocatable hold-down frame,
    (H) a pair of horizontally spaced eccentrics each having,
    (I) a crankpin on said eccentrics,
    (J) and link chain connecting rod means between the ends of said hold-down frame and said crankpins.

4. In a scrap disposal apparatus as set forth in claim 1 wherein said rotary chopper unit includes,
    (G) a main rotary knife shaft,
    (H) a plurality of radially disposed knives on said shaft,
    (I) a fixed knife operatively positioned with said knives on said shaft,
    (J) and hold-down means operatively connected to said rotary knife shaft including:
    (K) a vertically reciprocatable hold-down plate,
    (L) an eccentric having a crankpin fixed thereon driven from said rotary knife shaft,
    (M) and a link chain connecting rod element between said crankpin and said hold-down plate.

5. In a scrap disposal apparatus as set forth in claim 1 wherein said chopped steel slinger unit includes,
    (G) a rotary slinger shaft,
    (H) a plurality of radially disposed link chains fixed at one end to said shaft,
    (I) a peripheral housing around the outer ends of said chains,
    (J) and inlet and discharge ducts operatively connected in said housing.

6. In a scrap disposal apparatus as set forth in claim 1 wherein said hammermill cleaning and compacting unit includes,
    (G) a vertical shaft with means for rotating the same,
    (H) a rotor having loosely journaled rotary hammer cutters circumferentially spaced about the periphery of said rotor,
    (I) a downwardly converging circular housing surrounding said rotor,
    (J) conical surface means on top of said rotor to distribute incoming material at the top of said housing to the work engaging space between the inside of said circular houisng and said rotary hammer cutters,
    (K) whipping and discharge blades on the bottom of said rotor within said circular housing,
    (L) and a discharge duct in the bottom of said housing arranged to receive the cleaned and compacted material from said hammermill unit.

7. A hammermill cleaning and compacting device comprising in combination:
    (A) a frame including a bottom floor,
    (B) a downwardly converging cylindrical casing supported on and extending upwardly from said bottom floor,
    (C) a top cover fixed to the upper end of said casing,
    (D) a vertically disposed shaft located within said casing and journaled in said bottom and top thereof,
    (E) means on said frame connected to drive said shaft,
    (F) a rotor fixed on said shaft comprising,
    (G) a series of radially disposed discs fixed in axially vertically spaced positions on said shaft,
    (H) a series of vertically disposed shafts fixed adjacent to the outer periphery of said shaft and extending between the radial surfaces of said discs,
    (I) rotary hammer cutters loosely journaled on said fixed shafts having work engaging teeth formed on the periphery thereof,
    (J) and a conical material distributing surface formed on the top of said rotor sloping downwardly and outwardly from the upper end of said vertical shaft to the outer periphery of said rotor.

8. In a hammermill cleaning and compacting device as set forth in claim 7 wherein there is provided radially disposed whipping and discharge blades fixed to the bottom of said rotor below said rotary hammer cutters.

9. In a hammermill cleaning and compacting device as set forth in claim 7 wherein there is provided a discharge duct communicating with the bottom of the inside of said casing to receive and outwardly discharge the worked material from said hammermill.

References Cited

UNITED STATES PATENTS

| | | | |
|---|---|---|---|
| 95,693 | 10/1869 | Kaylor | 72—437 |
| 1,656,063 | 1/1928 | Harrison | 83—355 X |
| 1,851,334 | 3/1932 | Stein et al. | 83—355 X |
| 2,059,229 | 11/1936 | Gregg | 100—39 |
| 2,150,984 | 3/1939 | Near et al. | 241—186 |
| 2,556,936 | 6/1951 | Munschauer | 83—465 |
| 2,573,213 | 10/1951 | Miller | 241—108 X |
| 2,986,992 | 6/1961 | Patros et al. | 100—218 |
| 3,005,403 | 10/1961 | Van Endert | 100—98 |
| 3,180,249 | 4/1965 | Patros | 100—39 |
| 3,237,554 | 3/1966 | Davis | 100—218 |
| 3,266,413 | 8/1966 | Sharp et al. | 100—218 X |
| 3,283,698 | 11/1966 | Williams | 100—97 |

FOREIGN PATENTS 658,543   2/1963   Canada.

BILLY J. WILHITE, *Primary Examiner.*